（12）United States Patent
Bauman et al.

(10) Patent No.: US 7,213,109 B1
(45) Date of Patent: May 1, 2007

(54) SYSTEM AND METHOD FOR PROVIDING SPECULATIVE OWNERSHIP OF CACHED DATA BASED ON HISTORY TRACKING

(75) Inventors: Mitchell A. Bauman, Circle Pines, MN (US); Joseph S. Schibinger, Phoenixville, PA (US)

(73) Assignee: Unisys Corporation, Blue Bell, PA (US)

( * ) Notice: Subject to any disclaimer, the term of this patent is extended or adjusted under 35 U.S.C. 154(b) by 489 days.

(21) Appl. No.: 10/304,919

(22) Filed: Nov. 26, 2002

(51) Int. Cl.
*G06F 13/00* (2006.01)
*G06F 12/00* (2006.01)
*G06F 3/00* (2006.01)
*G06F 13/18* (2006.01)

(52) U.S. Cl. .................. 711/133; 711/136; 711/141; 711/151; 711/156; 710/40; 710/41; 345/535

(58) Field of Classification Search ............... 711/133, 711/136, 141, 151, 156; 710/40, 41; 345/535
See application file for complete search history.

(56) References Cited

U.S. PATENT DOCUMENTS 5,701,426 A * 12/1997 Ryan ........................... 711/3
6,052,760 A * 4/2000 Bauman et al. ............. 711/119
6,505,260 B2 * 1/2003 Chin et al. .................... 710/41
6,615,322 B2 * 9/2003 Arimilli et al. ............. 711/145
6,636,946 B2 * 10/2003 Jeddeloh ..................... 711/138
6,725,329 B1 * 4/2004 Ng et al. ..................... 711/113
6,862,663 B1 * 3/2005 Bateman ..................... 711/133
2003/0070016 A1 * 4/2003 Jones et al. ................. 710/107

* cited by examiner

*Primary Examiner*—Hyung Sough
*Assistant Examiner*—Mardochee Chery
(74) *Attorney, Agent, or Firm*—Charles A. Johnson; Beth L. McMahon; Mark T. Starr

(57) ABSTRACT

A system and method for managing memory data is provided. Data stored within a main memory may be requested by multiple requesters that may include one or more cache memories. When the data is provided by the main memory to a requester, it will be provided in a state that is based on the way the data was recently used by the requesters. For example, if a pattern of read-only usage has been established for the data, the data will be returned to a requester in a shared state. If data that was provided in a shared state must be updated such that the requester is required return to main memory to obtain read/write privileges, the main memory will thereafter provide the data in an exclusive state that allows write operations to be completed. This will continue until a pattern of read-only usage is again established.

28 Claims, 5 Drawing Sheets

| REQUEST TYPE | MSU OWN | SHARED | SAME REQUESTER | EXCLUSIVE DIFFERENT REQUESTER RESPONSE | | | |
|---|---|---|---|---|---|---|---|
| | | | | INVALID NO DATA | SHARED NO DATA | MODIFIED WITH DATA | MODIFIED SHARED WITH DATA |
| CODE READ | NOT TRACKED | NOT TRACKED | UNCHANGED | NOT TRACKED | NOT TRACKED | NOT TRACKED | NOT TRACKED |
| OPERAND READ (RCR COPY) | UNCHANGED | NOT TRACKED | UNCHANGED | NOT TRACKED | NOT TRACKED | MAX COUNT | NOT TRACKED |
| OPERAND READ (RCR OWN) | UNCHANGED | NOT TRACKED | UNCHANGED | -1 | UNCHANGED | MAX COUNT | UNCHANGED |
| OPERAND READ FOR OWNERSHIP | UNCHANGED | MAX COUNT | -1 | -1 | UNCHANGED | MAX COUNT | UNCHANGED |
| OPERAND OWNERSHIP ONLY | UNCHANGED | MAX COUNT | -1 | UNCHANGED | UNCHANGED | UNCHANGED | UNCHANGED |
| I/O PURGE AND GET OWNERSHIP | UNCHANGED | MAX COUNT | -1 | -1 | UNCHANGED | MAX COUNT | UNCHANGED |
| FLUSH CACHE LINE | UNCHANGED | 0s | UNCHANGED | UNCHANGED | UNCHANGED | UNCHANGED | UNCHANGED |
| PROCESSOR WRITE INVALID | UNCHANGED | 0s | MAX COUNT | UNCHANGED | UNCHANGED | UNCHANGED | UNCHANGED |
| PROCESSOR WRITE EXCLUSIVE | UNCHANGED | 0s | MAX COUNT | UNCHANGED | UNCHANGED | UNCHANGED | UNCHANGED |
| PROCESSOR WRITE SHARED | UNCHANGED | 0s | NOT TRACKED | UNCHANGED | UNCHANGED | UNCHANGED | UNCHANGED |
| I/O WRITE INVALID | UNCHANGED | 0s | 0s | UNCHANGED | UNCHANGED | UNCHANGED | UNCHANGED |
| CACHE LINE REPLACE | UNCHANGED | NOT TRACKED | UNCHANGED | UNCHANGED | UNCHANGED | UNCHANGED | UNCHANGED |
| I/O SNAPSHOT READ | UNCHANGED | NOT TRACKED | UNCHANGED | UNCHANGED | UNCHANGED | UNCHANGED | UNCHANGED |

FIG. 4

OWNED FORMAT

| 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| CRDC | 0 | MO | OWNER PORT ID | | | | CACHE LINE STATE | | | RCR | | | | CURRENT OWNER | | | | | |

SHARED FORMAT

| 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| CRDC | 1 | 0 | X | | | | | | | SHARED VECTOR | | | | | | | | | |

522 — 520

FIG. 5B

SYSTEM AND METHOD FOR PROVIDING SPECULATIVE OWNERSHIP OF CACHED DATA BASED ON HISTORY TRACKING

RELATED APPLICATIONS

The following co-pending applications of common assignee have some subject matter in common with the current application:

Ser. No. 10/304,729 entitled "System and Method for Accelerating Ownership within a Directory-Based Memory System", filed on even date herewith, and incorporated herein by reference in its entirety.

FIELD OF THE INVENTION

The present invention relates generally to shared memory multiprocessor systems, and more particularly to a system and method for determining a memory optimization state for requested data.

BACKGROUND OF THE INVENTION

In many multiprocessor systems, all of the processors access a common memory, referred to as main memory. Typically, main memory is not capable of supplying data and instructions to multiple processors at adequate speeds. To compensate for the speed deficiencies of main memory, caches are usually incorporated. Caches are small high-speed memories located between main memory and the processor, and that are updated to contain recently accessed contents of the main memory. A cached copy of the contents of main memory can be accessed at a much higher speed than from main memory.

In multiprocessor systems, caches are usually attached to each processor. Thus, multiple copies of a particular data item may reside within multiple caches at any given time. In this situation, a memory coherency protocol must be used to ensure that each processing device such as an Instruction Processor (IP) always operates from the same, most recent, copy of the data. This type of protocol allows data to be shared among many devices for read-only purposes. Before a device can modify the data, it must gain exclusive access to the data. In this case, all other cached copies of the data are marked as unusable, or "invalidated". After a device gains exclusive access to data, the device may, but is not required to, modify the data. When a device relinquishes exclusive access rights, any updated copy of the data must be stored in the main memory, or may be provided to another cache within the system.

One cache coherency mechanism of the type described above is the MESI (Modified Exclusive Shared Invalid) protocol. Single bus multiprocessor systems using a MESI protocol allow the devices on the bus the ability to snoop the bus to observe all data requests on the bus. In a MESI protocol, a cache will snoop the request bus to ascertain the status of a data unit that it is requesting. If it is determined that no other device, with the exception of main memory, is currently holding a copy of that data unit, then the cache can obtain that data unit in the exclusive state, and thus write to that data unit without having to go back to the bus to acquire ownership or exclusive rights.

In a multiprocessor system comprising a hierarchy of buses, the ability to snoop the bus to determine the status of a data unit on all devices in the system no longer exists. When a processor requests read access to a data unit, the system must now decide whether to give the data to the processor in a shared state or in an exclusive state. In conventional systems, the general technique used is to provide the data in the shared state. If the processor later desires write access to the data, the processor must make another request to obtain the data in the exclusive state. This additional request consumes the band pass of the system interfaces as well as the main memory, and forces the processor to wait for the return of data before the write operation can complete.

Some prior art systems seek to minimize the above-described problems by predetermining that certain access rights will always be granted based on the type of data being requested. For example, if a request is made to access an area of memory storing instructions, the main memory will return the data in a shared state, since it is unlikely this data will be modified during runtime. Similarly, if the data was written to memory by an input/output operation as would occur during system initialization, and has not since been updated by an instruction processor, the data is likely to be read-only data. It is therefore returned to the requester in a shared state. In contrast, if the memory data has been updated by an instruction processor after initialization was completed, the data is considered to be read/write data, and is therefore returned to requester in the exclusive state.

Although the foregoing approach provides performance gains, it is relatively simplistic, and thereby causes some inefficiencies. For example, this mechanism does not take into account the use of static variables. Static variables are generally stored within main memory by an instruction processor some time after memory initialization is completed. Thereafter, these variables are referenced for read-only purposes. This is common, for instance, during the initialization of an operating system when one or more instruction processors store configuration variables to one or more tables within the main memory. These variables are thereafter referenced solely as read-only data. If prior art mechanisms are applied to static variables, exclusive access will be granted when requests are made for these variables. This is because these variables were updated after the original initialization of main memory. As a result, only a single processor will be able to access these variables at once. In the case of frequently referenced system data, this is a highly inefficient situation that will impose a high degree of latency on the processors within the system.

Commonly assigned U.S. Pat. No. 6,052,760 to Bauman et al. provides another mechanism for predetermining the type of access rights that should be granted for particular types of data. Although the '760 patent is not directed towards solving the problems related to static variables, it does address the efficient manage of "software locks". A software lock is a memory location, or "cell", that is being used to control access to an associated data structure. Before a software process may access the data structure, it must first acquire the lock. This is accomplished by writing the lock cell to a predetermined state. A lock cell can only be acquired if it has not already been acquired by another software process, as is indicated by the state of the lock cell. Therefore, software locks are generally obtained using an indivisible test-and-set operation whereby the lock cell is tested, and if available, is set in a single, unified sequence of events.

The system described in the '760 patent is designed to identify potential software locks. This is accomplished by detecting memory locations that are read, and then written, during successive memory operations, as would be the case during test-and-set operations. After a memory location has been identified as a potential memory lock, any subsequent request for that location will be satisfied by returning the contents of the location to the requester in the exclusive state. Exclusive access is provided so that a requester may immediately obtain the lock, if it is available, without making an additional request to obtain exclusive access rights for the lock cell.

Several observations may be made regarding the system of the '760 patent. First, although this system provides for the efficient acquisition of software locks, it does not necessarily make the subsequent use of the lock cell more efficient. This can be appreciated by considering the typical use of a lock cell. After a first processor acquires the lock using a write operation, one or more additional processors may continue to test the value of the lock cell to determine when the lock is released by the first processor such that it may be acquired by one of the additional processors. Each time a processor performs a test operation, exclusive access to the lock cell is provided. Assuming at least two processors are testing the lock cell during the same time period, obtaining exclusive access rights to the lock cell likely involves invalidating an exclusive copy of a lock cell in another processor's cache, then obtaining a copy of the lock cell from main memory or from that other processor. Because testing of a lock cell is generally performed within tight software loops, the process of continually invalidating, then copying, the lock cell may be repeated thousands of times while waiting for the lock to be released. This memory thrashing places a significant amount of traffic on the memory interfaces. It also consumes a significant portion of the bandwidth of the main memory by repeatedly filling the memory input queues with requests for the lock cell. Finally, it increases the latency associated with releasing the lock, since the first processor will not obtain access to the lock cell until all preceding requests from the other processors have been satisfied.

What is needed, therefore, is a system and method for addressing the foregoing problems in a manner that optimizing the granting of access rights to shared memory data.

SUMMARY OF THE INVENTION

The current invention provides a system and method for managing memory data. A main memory is provided to store data signals. This data may be requested by multiple requesters that may include one or more cache memories. When the data is provided by the main memory to a requester, it will be provided in a state that is determined based on the way the data was recently used by the requesters. For example, if a pattern of read-only usage has been established for the data, the data will be returned to the requester in the shared state. If data that was provided in a shared state must later be updated, the requester is required to first return to the main memory to obtain read/write privileges. In this case, the main memory will thereafter provide the data in an exclusive state. This will continue until a pattern of read-only usage is again established for the data, at which time the data will be provided in the shared state. According to one embodiment of the invention, a read-only pattern is established after a predetermined number of requests results in an exclusive copy of the data being used for read-only purposes. According to another aspect of the invention, this predetermined number of requests is programmable, and may be selected at initialization time, or some time thereafter.

In one embodiment, the main memory includes a directory. The directory includes state information for each cache line of data stored within the main memory, wherein a cache line is 128 bytes long. Other embodiments may utilize cache lines having a different size. The state information includes a Read Conditional Response (RCR) value that is used to track the recent history of usage of the cache line. When a shared copy of a cache line is provided to a requester, and that requester must later obtain the cache line in the exclusive state so a modification can be completed, the RCR value is set to a predetermined positive number. Thereafter, the cache line is provided in the exclusive state in response to at least the predetermined number of requests. Whenever an exclusive copy of a cache line is provided to a requester that uses that data for read-only purposes, the RCR value is decremented. When the RCR value is decremented to zero, the cache line is thereafter again provided in the shared state.

According to the invention, an updated RCR value is generated each time the associated cache line is accessed. The updated RCR value is determined based on the type of request that is requesting cache line access, as well as the current cache line state. The updated RCR value is stored back to the directory for use the next time the cache line is accessed.

In one embodiment of the invention, the RCR value is used only in response to predetermined types of requests. For example, in a particular embodiment, the RCR value is only used in response to "operand read" requests that read operand data. The RCR value is employed in this case since operand data may be used either for read-only or read/write purposes. In this case, a recently established pattern of data usage can be employed to make a "best-guess" determination concerning the state in which the data should be returned to the requester. For example, while a lock-cell is being tested for lock availability, a read-only pattern of usage will be established to cause the lock-cell to be returned in the shared state. This will allow multiple requesters to test the lock-cell at the same time. As another example, consider the case of an operand that is repeatedly updated by a first application, and then used for read-only purposes by a second application. The different patterns of usage will be established in both instances, and will eventually result in the data being provided in the appropriate state in both cases.

According to one aspect of the invention, a system is provided to manage memory data that is requested by one or more requesters. The system includes a main memory to store data signals, and a circuit coupled to the main memory to determine a state in which requested ones of the data signals are provided by the main memory to a requester. The state is based on the manner in which the requested ones of the data signals were recently utilized.

In another embodiment, a memory system is disclosed that includes multiple requesters, and a main memory to store data signals. The main memory is coupled to provide any of the requesters with requested ones of the data signals. The system further includes a circuit coupled to the main memory to determine access rights for the requested ones of the data signals. The access rights are determined based on the way in which the requested ones of the data signals were recently used.

In still another embodiment, a method is provided for use in a data processing system. The data processing system includes a main memory to store data signals, and multiple requesters coupled to the main memory to request ones of the data signals. The method includes the steps of receiving a request for ones of the data signals from any of the multiple requesters, and determining a state in which the main memory is to provide the requested ones of the data signals. The state is based on the manner in which the requested ones of the data signals have been utilized in response to a predetermined number of most recent requests for the data signals.

According to yet another aspect of the invention, a memory management system is disclosed that includes memory means for storing data signals, cache memory means for caching ones of the data signals, and state calculation means for determining a state in which to cache the ones of the data signals. The state is based on how the ones of the data signals have recently been used within the cache memory means.

Other scopes and aspects of the current invention will become apparent from the following description and accompanying drawings.

BRIEF DESCRIPTION OF THE DRAWINGS

FIG. 4 is a table illustrating one embodiment of the mechanism employed by state calculation logic in generating a next RCR value.

FIG. 5A is a diagram illustrating one embodiment of a format of the cache line state information when a cache line is not in a shared state.

FIG. 5B is a diagram illustrating one embodiment of a format of the cache line state information when a cache line is in a shared state.

DETAILED DESCRIPTION OF THE DRAWINGS

Figure 1:
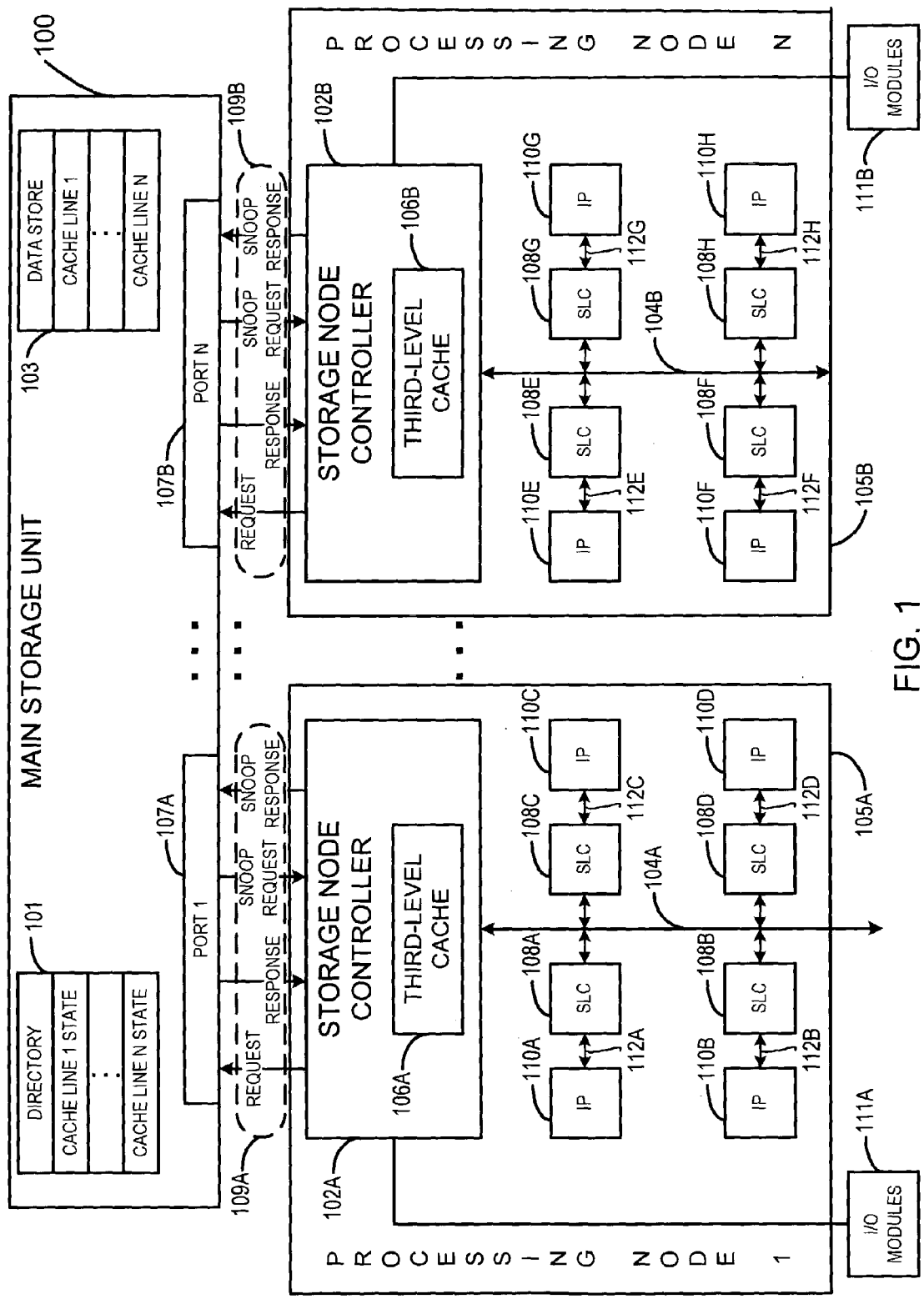
FIG. 1 is a block diagram of an exemplary data processing system of the type that may employ the current invention.

FIG. 1 is a block diagram of an exemplary data processing system of the type that may employ the current invention. The system includes a Main Storage Unit (MSU) 100 that provides the main memory for the system. Although the system of FIG. 1 includes only a single MSU 100, multiple MSUs may be provided, each being mapped to a portion of the system address space in a manner largely beyond the scope of the current application. MSU 100 may include Random Access Memory (RAM), Read-Only Memory (ROM), and any other type of memory known in the art.

In one embodiment, MSU is a directory-based storage unit similar to the system described in commonly-assigned U.S. patent application Ser. No. 09/001,598 filed Dec. 31, 1997 entitled "Directory Based Cache Coherency System Supporting Multiple Instruction Processor and Input/Output Caches", incorporated herein by reference. In this embodiment, MSU includes both a directory 101 and a data store 103. Data store 103 stores the data, including the instructions and operands, which may be referenced by any of the processors within the system. Directory 101 stores information that indicates where the latest copy of these data signals resides within the system to ensure that every processor is operating from this copy. This is necessary since data from data store 103 may be copied into any of the various cache memories within the system. In the current embodiment, directory 101 includes a directory entry for each 128-byte block of data within data store 103, wherein a 128-byte block is referred to as a "cache line". Other embodiments may utilize cache lines of different sizes. The cache lines are shown within data store 103 as "cache line 1" through "cache line N". The respectively associated entries within directory 101 are shown as "cache line 1 state" through "cache line N state".

MSU is coupled to one or more processing nodes shown as processing node 1 105A through processing node N 105B. More or fewer processing nodes and memory ports may be included within the system. Each processing node is connected to a different memory port shown as port 1 107A through port N 107B, respectively, via dedicated high-speed interfaces 109A through 109B (shown dashed). Each of these interfaces has four sets of signals, including request, response, snoop request, and snoop response signals. The use of these signals will be discussed below. Each processing node may also be coupled to an I/O complex, shown as I/O complexes 111A and 111B. Each of these I/O complexes contains one or more industry-standard or proprietary I/O modules that communicate with storage medium such as disk tape subsystems and communication equipment.

Each processing node includes a Storage Node Controller (SNC) shown as SNCs 102A and 102B for processing nodes 1 and N, respectively. Each SNC includes logic that interfaces with a respective high-speed MSU interface 109A or 109B, and further includes logic to interface to a respective one of processor buses 104A and 104B. Each SNC includes a respective ownership cache and all supporting logic. This cache may be a Third-Level Cache (TLC), a Fourth-Level Cache (4LC), or some other type of cache memory. In the embodiment shown, these caches are TLCs 106A and 106B. The ownership caches are discussed further below.

As noted above, each of SNCs 102A and 102B is coupled to a respective processor bus 104A and 104B. These processor buses can utilize any type of bus protocol. Each processor bus interfaces to multiple local cache memories. In the current embodiment, the local cache memories are shown as Second-Level Caches (SLCs) 108A–108H. In another embodiment, these local caches may be Third-Level Caches.

Each SLC 108 is coupled to a respective one of the Instruction Processors (IPs) 110A–110H over a respective interface 112A–112H. For example, SLC 108A is coupled to IP 110A via interface 112A, SLC 108B is coupled to IP 110B via interface 112B, and so on. The IP may be any type of processor such as a 2000™ processor commercially available from Unisys Corporation, a processor commercially available from Intel Corporation, or any other processor known in the art. Each IP may include one or more on-board caches. In the current embodiment, each IP may include a First-Level Cache (FLC). Preferably, each IP resides on a single Application Specific Integrated Circuit (ASIC) device with a respective SLC 108. Alternatively, an IP may be coupled to a respective SLC over an external interface.

In general, the caches within the processing nodes are ownership caches. As such, each cache maintains information that describes the state of each of the cache lines resident within the cache. A cache line may be in at least one of four mutually exclusive states, including a modified, exclusive, shared, or invalid state. These states are sometimes said to implement a "MESI" protocol.

When a cache line is stored in the modified state, the cache line copy has been modified, and is therefore the most up-to-copy of the cache line that resides within the system. All other copies of this cache line are said to be "stale", or outdated, and cannot be used, either for read-only or read/write purposes. At any given time, only one cache may store a copy of a particular cache line in the modified state. The cache that stores such a copy is said to "own" the cache line. If another processor requires use of the cache line, it must obtain the updated copy. Until another cache obtains the updated copy, the modified cache line copy may be used for read and/or write purposes.

When a cache line is retained in the exclusive state, the cache stores the latest cache line copy. Until this cache line is modified, the MSU also stores the latest copy of this data. At any given time, only one cache may store a valid copy of the cache line in the exclusive state. This cache line may be used for read and/or write purposes, and is said to be owned by the cache.

A cache line may further be stored within a cache in a shared state. In this case, the cache line is used for read-only purposes. The cache line may be stored in multiple caches within the system in the shared state. If another cache requests exclusive access to the cache line, all copies of that cache line that exist in the shared state must be "invalidated", or marked as unusable.

Finally, a cache line may reside within a cache in an invalid state. In this case, the cache line has been marked as unusable, and can not be used for read or write purposes. If a cache requires the use of an invalid cache line, it must obtain a valid copy from another memory within the system.

The manner in which memory requests are processed within the system can best be understood by example. Assume IP 110A requires read/write access to a cache line. IP 110A first attempts to retrieve the cache line from its internal cache(s) such as its FLC. If the cache line is not resident within the FLC, a request is sent to the respective SLC 108A. If the requested cache line is likewise not resident within the SLC, the SLC issues a request on the processor bus 104A. In one embodiment of the invention, each SLC implements a bus snoop protocol to monitor the processor bus for such requests. When the request is "snooped" by the SLCs 108B–108D, any SLC that retains the data in the requested state will return the data on processor bus 104A. Similarly, SNC 102A is snooping the bus for such requests. If TLC 106A stores the most recent copy of the cache line in the desired state, the cache line will be returned to the SLC 108A to be forwarded to IP 110A.

In some instances, data requested by IP 110A is not resident in the requested state within any of the cache memories associated with its processor bus 104A. In that case, SNC 102A uses the request signals of interface 109A to forward the request to MSU 100. The request signals include a cache line address, an identifier to indicate which processing node provided the request, and a transaction identifier for tracking multiple requests from a single node. If the request is of a type that includes data, the write data will also be provided by the request signals. The request signals further include a request type to indicate whether the processing node is requesting the cache line in the exclusive state so that read and write operations may be performed, or whether the cache line is requested in the shared state for read-only purposes. The various request types are discussed below. Finally, the request signals further provide a destination node identifier that is generated by SNC 102A by mapping the request address into the system address space. In an embodiment such as that mentioned above wherein MSU 100 is comprised of multiple memory units, this identifier indicates which of these units is to receive the request.

After receiving the request, MSU 100 determines the location and state of the most recent copy of the cache line using the cache line state information stored within its directory 101. In the current embodiment, directory 101 indicates that a cache line is in one of a number of predetermined states that include, but are not limited to, the following:

MSU Own;

Exclusive; and

Shared.

MSU Own State

All cache lines in the MSU are placed in the MSU own state after system initialization and before any cache lines have been copied into one of the system caches. This state indicates that the MSU has the most recent copy of the cache line. Since only the MSU is considered to have a valid copy of any cache line that is in the MSU own state, an error occurs if any SNC 102A issues a request to write to a cache line that is in this state.

Exclusive State

This state is described above in reference to the MESI protocol. When MSU 100 grants a copy of a cache line to a processing node for read and/or write purposes, directory 101 records the processing node's identity, and indicates the cache line is held in the exclusive state. Once a cache line is granted in an exclusive state, the copy retained by the MSU may not be provided to another processing node. If the MSU receives another request for the cache line while it is in this state, the MSU must retrieve the cache line copy from the owner by issuing a snoop request, as will be discussed below.

Shared State

This state is described above in regards to the MESI protocol. In this state, the cache line may reside within one, several, or all of the caches in the system at once for read-only purposes. The MSU is still considered to have a valid copy of the cache line, which may be provided to another cache for read-only purposes. Directory 101 records which one or more of the processing nodes have a valid copy of the cache line.

Returning to the current example, if the cache line were resident within MSU 100 in the MSU own state, MSU could provide this data directly to processing node 1 105A over the response lines of interface 109A. These lines include data signals, the original requester id, the transaction id, and a response type. The transaction id is the same as that included with the original request, and is used by the SNC 102A to match the request to the response. The response type indicates whether the cache line is being provided in the exclusive or the shared state. The MSU delivers the cache line in the state that was indicated on the request lines, which, in the current example, is the exclusive state. MSU further updates directory 101 to record that processing node 1 105A retains the cache line copy in the exclusive state.

The foregoing discussion assumes the cache line is available within MSU 100 in a state that allows its immediate return to the requester. Assume, instead, that the cache line state information stored within directory 101 indicates that the cache line is retained in the exclusive state by processing node N 105B. The MSU is therefore not able to provide the cache line directly to processing node 1 105A, but instead must issue a snoop request to node N to prompt the return of any updated cache line data to MSU 100.

A snoop request is issued to processing node 105B from port N 107B across the snoop request lines of interface 109B. These signals include a cache line address, a snoop type, a source and destination identifier, and a transaction tracking identifier. The snoop type indicates the type of snoop request being issued, the destination identifier indicates the processing node that is to receive the request, and the transaction tracking identifier is an identifier generated within MSU 100 that is used to later match a snoop response to the snoop request.

Upon receiving the snoop request, directory state information stored within TLC 106B is used to determine whether any of the SLCs 108E–108H has a copy of the data.

If not, SNC 102B may return the cache line directly to MSU 100. This return of ownership and data is issued across the snoop response lines of interface 109B. The snoop response lines include cache data signals, response type signals, and the transaction-tracking id that was provided with the snoop request. If, however, any of the SLCs 108E–108H retains a copy of the cache line, SNC 102B issues a request to each of the SLCs 108E–108H via bus 104B requesting return of ownership and any modified data. This request is snooped by SLCs 108E–108H such that any of these SLCs having a valid data copy will invalidate that copy, and will further invalidate any copy stored by the associated FLC. If any one of these SLCs had acquired exclusive ownership of, and subsequently modified, the data, that modified copy is returned to SNC 102B during a "write back" operation. If the data is not modified, only ownership is returned. SNC 102B then returns ownership and, if necessary, modified data to MSU 100 using a snoop response, as discussed above.

After the snoop response is forwarded to MSU 100, MSU provides any returned data to processing node 1 105A over the response line of interface 109A and updates directory 101 in the manner discussed above. If data is not returned with the snoop response, the data is obtained from data store 103 and provided to processing node 1 105A. The manner in which this is accomplished is discussed further below.

When SNC 102A receives the cache line data, it provides this data in the exclusive state to requesting IP 110A via SLC 108A so that execution may continue. IP 110A and SLC 108A now own this cache line. State information within TLC 106A records that a processor on processor bus 104A has a copy of this cache line in the exclusive state.

As is apparent from the foregoing discussion, obtaining requested data may be time-consuming. In the foregoing example, IP 110A issues a request for an exclusive copy of data that is resident in SNC 102B or one of the associated SLCs 108E–108H. This request is fulfilled by invalidating the copies of data stored within processing node N 105B, then transferring the data from processing node N 105B to processing node 105A. The time required to complete these operations may be significant, especially during times when system interfaces are experiencing significant traffic. Moreover, if processing node N 105B later determines that it requires access to the data in the exclusive state, the same operations must be performed. If, on the other hand, both processing nodes require only read access to the data, both nodes could retain shared data copies, making this repeated transfer of data unnecessary. It is therefore important, whenever possible, to grant only the rights that are actually needed to satisfy a memory request.

As discussed above, the request signals of memory interfaces 109 include a request type that indicates the type of access rights that are to be returned with a requested cache line of data. If instructions are being referenced, this request type indicates that the cache line is requested in the shared state, since instruction code is not typically modified. In contrast, if a processor requests a cache line so that a write operation may be completed, the request type indicates that the data should be returned in the exclusive state. In yet other situations, the request type indicates that an operand read is being performed. In this instance, the MSU determines which types of access rights to return with the data. This determination is based on whether the requested cache line has been updated during recent references as follows.

According to the current invention, the cache line state information stored in directory 101 includes a Read Conditional Response (RCR) field for each cache line. The RCR field reflects the history of the cache line. More specifically, the RCR field indicates whether the cache line has been modified within a predetermined number of the most recent cache line references. In one embodiment, this predetermined number is programmable, and may be adjusted based on system requirements. If a cache line has been modified within a predetermined number of the most recent cache line references, it is likely that it will be modified again during the current reference. Therefore, the MSU will return the cache line in the exclusive state. However, if the cache line has not been modified during the most recent predetermined number of references, it is unlikely to be modified during the current reference. The cache line is therefore returned in the shared state. This allows one or more other processors in the system to also retain a shared copy, if needed. The current invention can best be understood in reference to the remaining drawings.

Figure 2:
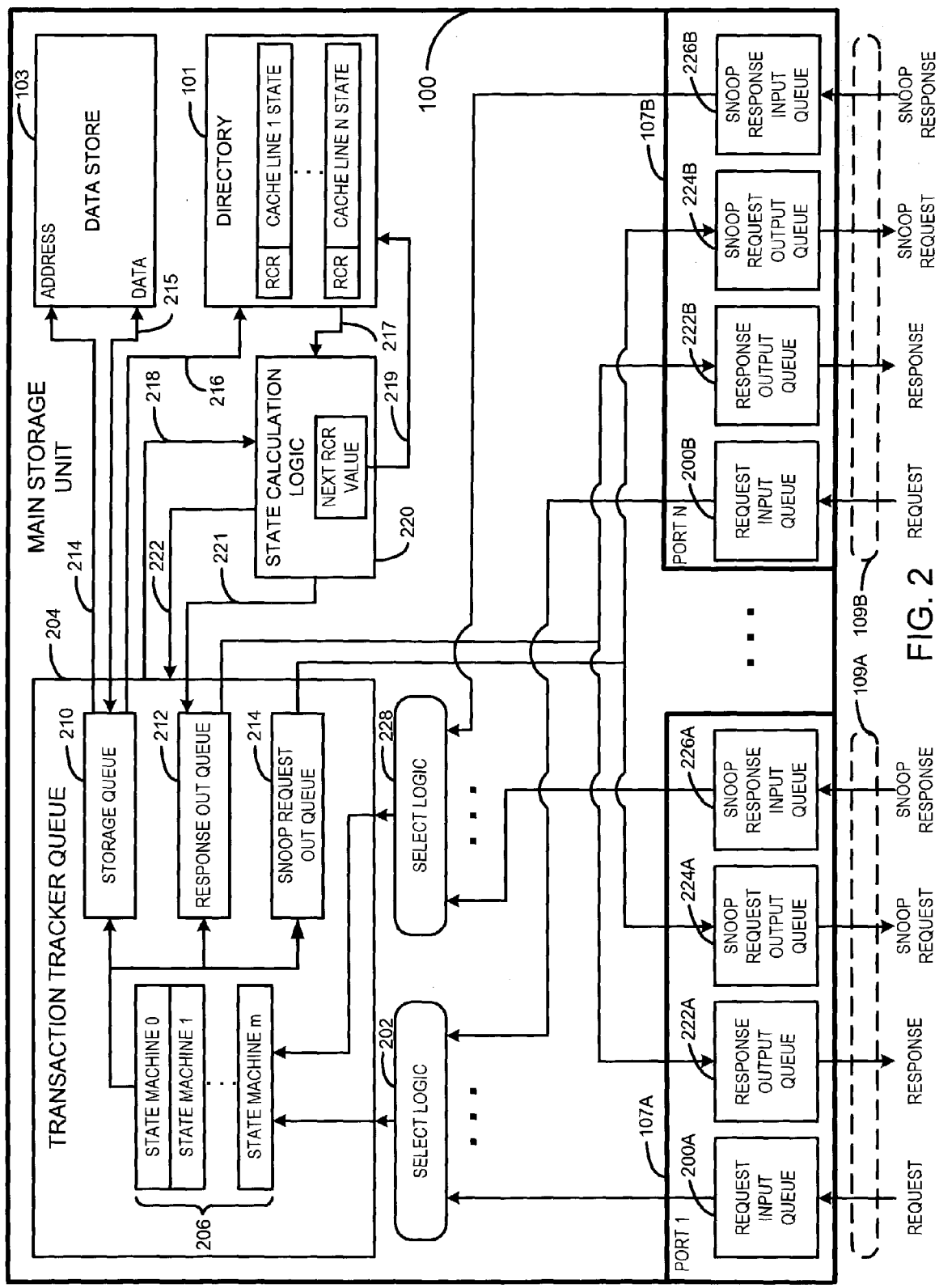
FIG. 2 is a more detailed view of the Main Storage Unit.

FIG. 2 is a more detailed view of MSU 100. As discussed above, each processing node 105 is coupled to the MSU via a high-speed interface (shown dashed). Interface 109A connects processing node 1, 105A, to port 1, 107A of MSU 100. Similarly, interface 109B couples processing node N 105B to port N, 107B of the MSU. Each of these interfaces includes request, response, snoop request and snoop response lines, as discussed above.

Each of the ports includes a respective request input queue. A request from a processing node is provided across the interface 109 and is stored within the request input queue of the respective port. For example, a request that is provided by processing node 105A over interface 109A will be stored temporarily in request input queue 200A of port 1, 107A. Similar queues are included within each port. Each request input queue is capable of storing multiple requests that are waiting to be processed by MSU 100.

The request input queues may each provide a stored request to select logic 202. Select logic includes logic that selects one of the pending requests based on a rotational fairness algorithm. The selected request is then stored within Transaction Tracker Queue (TTQ) 204. In one embodiment, an additional request may be stored within TTQ 204 each clock cycle.

The TTQ 204 includes multiple state machines 206 shown as state machine 0 through state machine m. A state machine is provided for each request that may be stored within TTQ 204. Each state machine is coupled to several queues, shown as storage queue 210, response out queue 212, and snoop request out queue 214. When a new request is stored within TTQ 204, the respective state machine is activated to track processing activities and to control the use of these TTQ queues for that request.

Upon activation of a state machine for a request, the state machine logic generates a request entry within storage queue 210 that includes a request address, request type, and any data provided with the request. The storage queue processes these request entries in a first-in, first-out (FIFO) manner. When a request gains priority, the request address and any data are provided to data store 103 on lines 214 and 215, respectively. Also at this time, the request address is provided on lines 216 to directory 101.

When a request is provided to data store 103, a full cache line of data will be read from, or written to, data store based on the request type. In the mean time, the address on lines 216 reads the cache line state information for the addressed cache line from directory 101. The cache line state information, including the RCR field, is provided on lines 217 to state calculation logic 220. State calculation logic also receives the request type and, in some cases, additional information to be discussed further below, on lines 218 from TTQ 204. In a manner to be described in detail below, the state calculation logic generates a new RCR value that is based on, among other things, the current cache line state and the type of request being made for the cache line. This new RCR value is then stored back to directory 101 on lines 219.

In addition to generating a new RCR value, state calculation logic 220 generates a cache line state signal on line 221. This signal, which is provided to TTQ 204, indicates whether any data that is returned to the requester should be provided in the exclusive or shared state. In the current embodiment, this cache line state signal is only used if the request type indicates an operand-type read operation is occurring. For request types other than operand reads, the cache line is returned in a state that is dictated by the request type itself. For example, if the request type indicates instruction code is being read, the cache line state is always returned in the shared state. This is discussed further below in reference to request types.

As discussed above, the state information read from directory 101 is used by state calculation logic 220 to generate a new RCR value, and further to generate a cache line state signal. This state information is also forwarded by state calculation logic 220 to TTQ 204 on lines 222. TTQ 204 will use this state information in conjunction with the request type of the current request to determine whether a snoop request is necessary to fulfill the current request. In some cases, the response may be issued without generating additional snoop requests. This is the case, for example, when the request stores data to data store 103. In this instance, a response is provided to the requesting processing node indicating that the operation is completed. In another scenario, a snoop response is unnecessary when a requested cache line is to be returned in the shared state, and the cache line state information indicates the cache line is in the MSU owns or shared state. In another case, a response may be returned to the requesting processing node immediately when a cache line is to be returned in the exclusive state, and the MSU owns the cache line. In still another scenario, the requested cache line may be returned immediately if the directory state indicates that cache line is already owned by the requesting processing node. This latter situation may occur, for example, if the requesting node had previously obtained the cache line in the exclusive state, had never modified it, but instead had invalidated it without notifying the MSU.

When it is determined that a response may be returned to the requesting processing node, TTQ generates the response using the cache line state information. As discussed above, this response includes the original transaction-tracking id provided with the request, any requested data, and a response type. If data is returned, this response type indicates the state in which the cache line is being provided. This response is stored within response out queue 212, and will be transferred to the appropriate port so that it may be forwarded to the processing node that initiated the request. In the current example, the response is transferred to response output queue 222A of port 1 107A. This request is then forwarded to processing node 1, 105A, when it gains priority.

After a response has been queued within the appropriate one of the response output queues and any memory updates have occurred, the respective one of state machines 206 indicates that the request processing is completed. The request is removed from TTQ 204 such that another request may be received in its place.

As noted above, in some cases, a snoop request must be issued to another processing node before a response may be issued to the requester. This occurs, for example, when the MSU cannot return the cache line in the required state. For example, if the request type indicates, or if state calculation logic 220 determines, that the cache line should be returned in the exclusive state, and if a valid copy of the cache line resides within another processing node, a snoop request must be generated. This request is issued to invalidate the cache line copy residing within that other processing node, and to prompt the return of any modified data.

If a snoop request is necessary, TTQ 204 generates the request, which is stored within snoop request out queue 214. As discussed above, this request includes a transaction id generated by TTQ 204, a snoop request type, and an address. The request is transferred to the snoop request output queue(s) of the appropriate port(s) based on the processing node(s) that have a copy of the requested cache line. In the current example, it will be assumed that processing node N 105B owns the requested cache line. The snoop request is therefore transferred to snoop request output queue 224B of port N 107B. A similar queue is provided for each of the other ports. This request is transferred to SNC 102B to be processed in the manner discussed above.

Eventually, processing node N 105B will return a snoop response to snoop response input queue 226B of port N 107B. This snoop response is provided to select logic 228, which selects one of the pending responses for presentation to TTQ 204 using a rotational fairness algorithm. This selected snoop response will be assigned to the state machine that is still processing the initial request using the transaction id that was included with the snoop request and returned with the snoop response.

After the snoop request is provided to the appropriate one of state machines 206 within TTQ 204, it may be used to immediately generate a response to the requester. This is possible if the snoop response returned data, and if the response type can be determined without another reference to directory 101. If this is the case, the state machine generates a response that is stored within response out queue 212. This response includes the cache line data returned from port N 107B along with a response type indicating the state of the cache line. This request will be transferred to the response output queue 222 of the appropriate port in the manner discussed above. In the current example, the request is transferred to response output queue 222A of port 1, 107A, so that it can be forwarded to processing node 1, 105A.

In addition to generating a response to the requesting processing node, the state machine further generates a request entry within storage queue 210. This request, which will be processed on a FIFO basis as discussed above, will store the updated data returned from processing node 105B to data store 103. This request entry within storage queue 210 will also initiate a read operation to read the cache line state information from directory 101 onto lines 217. State calculation logic uses the current cache line state information, including the current RCR value, as well as the request type and the snoop response type that are provided by TTQ 204 on lines 218, to generate the next RCR value in a manner to be discussed below. This new RCR value is stored back to directory 101 on lines 219.

After the modified data has been stored to data store 103 and the RCR value has been updated, the original request is removed from TTQ 204. This allows TTQ 204 to receive another request from one of the ports based on the fairness algorithm practiced by select logic 202.

The foregoing paragraphs assume that data was returned with the snoop request. This will only occur, however, if a processing node that had ownership of the cache line had actually modified the cache line data. In all other instances in which the cache line was not modified, the snoop response will only return ownership, or, if the cache line had been retained in the shared state, indicate that invalidation had been completed. In this case, the response can only be fulfilled after the data is retrieved from data store 103. Therefore, an entry is generated within storage queue 210. When the request entry gains priority, the requested cache line is read from data store 103 on lines 215, and is used by the associated state machine to generate a response in response out queue 212. The cache line state information is also read from directory 101 in the manner discussed above so that state calculation logic 220 can generate the next RCR value. As discussed above, this value will be determined using the current cache line state information, the request type, and the snoop response type. This RCR value is written to directory 101 on lines 219. Additionally, cache line state signal 221 is provided to TTQ 204 for use by the state machine in generating a response type. As discussed above, this signal is used in the current embodiment to determine whether a cache line will be returned in the exclusive or shared state in response to operand read requests.

When the response has been generated within response out queue 212, it is transferred to response output queue 222A to be provided to processing node 105A in the current example. The request processing is then considered complete, and the request may be removed from TTQ so that another request may be received.

The current invention allows a cache line to be returned to a requester in a state that is determined by the way in which that cache line was most recently used within the system. This determination is made by state calculation logic 220 in a manner discussed further in regards to the remaining drawings.

Figure 3:
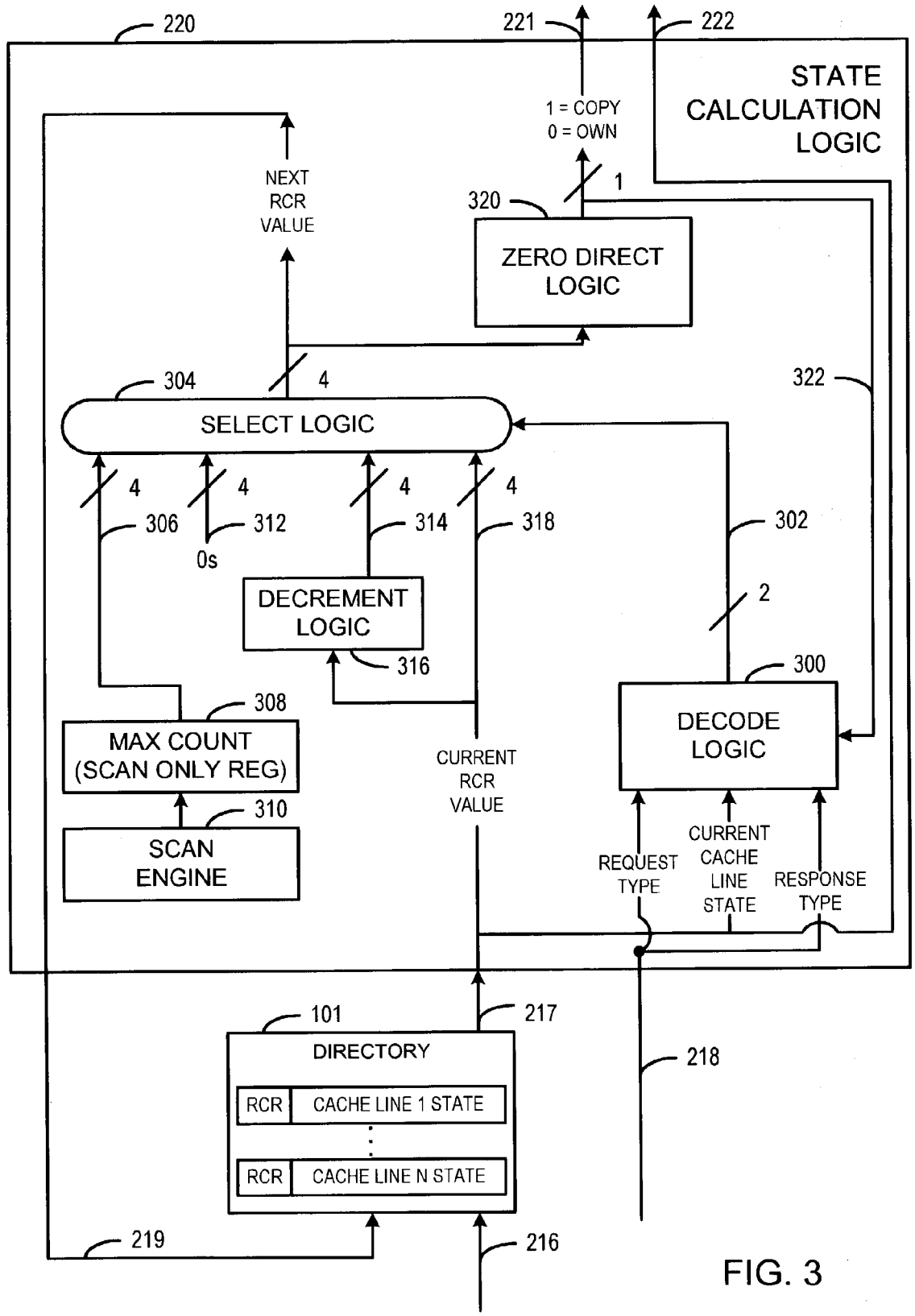
FIG. 3 is a logic block diagram of the state calculation logic.

FIG. 3 is a logic block diagram of state calculation logic 220. State calculation logic 220 is used to control the state in which a cache line is returned to the user as follows. According to one embodiment, each RCR value within directory 101 is initially set to zero. This RCR value indicates that, in response to an operand-type read request, the associated cache line is to be provided to a requester in the shared state. If, however, a requester that obtained the cache line in the shared state must later obtain cache line ownership to update the cache line, the RCR value is modified to a maximum predetermined value. As a result, the cache line is thereafter returned to requesters in the exclusive state. Each time the cache line is provided in the exclusive state without being modified, the RCR value is decremented. If the RCR value decrements to zero, the cache line is again provided in the shared state in response to a operand-type read request. This mechanism is discussed in more detail below.

State calculation logic includes decode logic 300 that is used in conjunction with select logic 304 to generate the next RCR value. As discussed above, the next RCR value is based on the request type, and if applicable, a snoop response type. These values are provided on lines 218 from TTQ 204. The next RCR value is also based on the current state of the cache line, which is provided by directory 101 on lines 217. Decode logic 300 uses these values in a manner to be discussed below to generate selection signals on lines 302.

The selection signals on lines 302 are provided to select logic 304 to control the selection of one of four values provided to the input ports of select logic 304. The first value is a maximum count value provided on lines 306. This value may be stored within a storage device 308 using a scan engine 310 or some other loading mechanism. This loading operation may be performed at system initialization time or any time thereafter. This count value is used to control the state in which a cache line is returned to the user, as will be discussed further below.

Select logic further receives a second value of all zeros on lines 312. A third value consisting of a decremented RCR count is received on lines 314. Decrement logic 316 generates this third value by decrementing a current RCR count value by a predetermined decrement value. In the current embodiment, the predetermined decrement value is "one". Finally, select logic receives the current RCR value from directory 101 on lines 318.

Select logic selects one of the four values at its input ports based on the selection signals provided on lines 302. This updated value is provided on lines 219 to directory 101 as the next RCR value. This value is also provided to zero detect logic 320. If the next RCR value is set to "zero", zero detect logic 320 activates cache line state signal 221, indicating the cache line should be provided in a shared state. If the next RCR value is a non-zero value, the cache line state signal remains de-activated, and the cache line is provided in an exclusive state. The cache line state signal is also provided to decode logic 300 on line 322. This signal is used by decode logic 300 in generating selection signals on lines 302 in a manner to be described below.

In addition to providing the cache line state signal 221 to TTQ 204, state calculation logic 220 also forwards the cache line state information received from directory 101 to TTQ 204 on line 222. This cache line state is used by TTQ to generate the response, as discussed above.

FIG. 4 is a table illustrating the mechanism employed by state calculation logic 220 in the current embodiment to generate a next RCR value. The table includes columns 400 through 414. Column 400 illustrates the possible types of requests that may be provided to the MSU. The remaining columns indicate the possible cache line states. Each entry within the table represents a next RCR value that is determined by the request type associated with the row, and the cache line state associated with the column. Before discussing the specific mechanism for determining a next RCR value in more detail, the various request types and cache line states are considered in more detail.

The request types listed in column 400 are as follows:

Code Read—This type of request retrieves a copy of a cache line in the shared state. Generally this request type is used to retrieve instructions, since a code bank will not typically be modified during run time.

Operand Read (RCR copy)—This request seeks access to a cache line including operand data. The state in which the cache line will be returned to the requester will be determined by state calculation logic 220 according to the current invention. In the instant case, zero detect logic 320 has determined that the requested cache line should be returned in the "RCR copy", or shared, state. The fact that the cache line is being returned in the shared state is communicated to decode logic 300 on line 322 (FIG. 3) for use in generating a next RCR value.

Operand Read (RCR own)—This is similar to the request type described in the foregoing paragraph. However, in this case, zero detect logic 320 has determined that the requested cache line should be returned in the "RCR own", or exclusive state.

Operand Read for Ownership—This request indicates that the requested cache line data is to be returned in the exclusive state. The MSU must honor this request. To do so, the MSU may have to issue one or more snoop requests.

Operand Ownership Only—An operand ownership only request indicates that the MSU is to return ownership, but not data, to the requester. This type of request is used when a cache line is initially obtained in the shared state and it is subsequently determined that ownership must be obtained so that the cache line may be modified.

I/O Purge and Get Ownership—This is a request type issued on behalf of I/O modules. It indicates that the MSU is to issue one or more snoop requests to invalidate any other copies of the cache line. Ownership, but not data, is then returned to the I/O module. This request is generally issued so that the cache line may be overwritten during an I/O operation.

Flush Cache Line—A request of this type flushes a cache line from wherever it resides within the system back to the MSU. When a MSU receives a request of this type, the MSU may have to issue one or more snoop requests to accomplish this flush operation. The state of the cache line will transition to MSU own.

Processor Write Invalid—This request is used to return cache line ownership and the latest modified data back to the MSU. The cache line state transitions to MSU own.

Processor Write Exclusive—This request type is used to return the latest data of a cache line back to the MSU without relinquishing ownership. This command is provided to support an embodiment having non-inclusive third-level caches that may age out a cache line that is still retained by another cache within the processing node.

Processor Write Shared—This request type is used to return the latest modified data and ownership to the MSU. The previous owner retains a copy of the cache line for read-only purposes.

I/O Write Invalid—A request of this nature is used to return ownership of unmodified cache line back to the MSU.

Cache Line Replace—This request is used to announce that a cache line is no longer being held by the requester. The requester does not expect a response back from the MSU when this type of request is issued.

I/O Snapshot Read—This request is used to fetch a current copy of a cache line. It does not change the cache line state anywhere in the system. That is, any cache memory that has already obtained the cache line may still retain it in the same state. This request type is generally issued by an I/O module.

Next, the various cache line states shown in columns 402 through 414 of FIG. 4 are discussed. Within directory 101, a given cache line may be in a MSU own, a shared, or an exclusive state, as discussed above. The MSU own and shared states are represented by columns 402 and 404 of FIG. 4, respectively. The exclusive state is represented by columns 406 through 414. This state is further sub-divided based on requester identity and a snoop response type. These columns have the following significance:

Same Requester—The cache line state shown in column 406 represents the situation where a request for a cache line is received from a processing node, and the directory state information indicates that processing node already owns the cache line. This situation occurs when all caches within a processing node age an unmodified copy of the cache line from memory, but do not inform the MSU that this operation has occurred. In this case, a snoop request is not needed to obtain the cache line data, which may be retrieved from data store 103 and provided to the requesting processing node.

Invalid No Data—This state is represented by column 408. Directory 101 lists the requested cache line as being in the exclusive state within a processing node that is different than the requesting processing node. MSU issues a snoop request to the owner. In response, the owner returns a snoop response having a response type of "invalid no data" to the MSU. This indicates that the requested cache line was never modified, and has been invalidated within all caches of the previous owner. This snoop response does not contain data.

Shared No Data—This state is represented by column 410. Directory 101 lists the requested cache line as being in the exclusive state within a processing node that is different than the requesting processing node. MSU therefore issues a snoop request to the owner for return of any modified data. The previous owner returns a snoop response having a response type of "shared no data" to the MSU. This indicates that the requested cache line was never modified, and is still shared by multiple processors within the processing node. This snoop response does not return data.

Modified With Data—This state is represented by column 412. Directory 101 lists the requested cache line as being in the exclusive state within a processing node that is different than the requesting processing node. MSU issues a snoop request to the owner, which returns a snoop response that includes the updated data. This snoop response, which has a response type of "modified with data", indicates that the requested cache line was modified, and that the requested cache line is no longer valid in any of the requesting node's caches.

Modified Shared With Data—This state is represented by column 414. Directory 101 lists the requested cache line as being in the exclusive state within a processing node that is different than the requesting processing node. MSU issues a snoop request to the owner, which returns a snoop response having a response type of "modified shared with data". This response indicates that the cache line was modified by the owner, and the modified data is being returned to the MSU in response to the snoop request. The previous owner retains a shared copy of the cache line.

As discussed above, each entry within the table of FIG. 4 indicates if, and how, the next RCR value will be changed based on the request type and cache line state for that entry's row and column, respectively. For example, entry 416 indicates that based on the request type of "code read" and the cache line state of "MSU own", the next RCR value is "not tracked". Each table entry will be listed as one of the following:

Not Tracked—This indicates that the cache line state information is in a "shared format" that does not allow the RCR value to be tracked. The shared format will be discussed further below in reference to FIG. 5B.

Unchanged—The previous RCR value is used as the next RCR value.

0s—The next RCR value is set to all zeros. When cache line state information includes an RCR value that is set to all zeros, the cache line is returned in the shared state.

−1—The next RCR value is obtained by decrementing the previous RCR value by a predetermined amount. In general, decrementation of an RCR value occurs when the associated cache line was most recently provided to a requester in the exclusive state, but the cache line data was never modified. If this occurs a predetermined number of times in succession, as determined by the maximum count value discussed above, the RCR value will be decremented to zero. Thereafter, the cache line will be provided in the shared state, as indicated above, since recent history indicates that updates to this cache line have not been required.

Max Count—The next RCR value is set to the maximum count value, which is stored within storage device 308 in the manner discussed above. This occurs when a cache line is returned to the MSU as modified. The cache line will be returned in the exclusive state until this maximum count is decremented back to zero. When the cache line is requested from the MSU by an operand read-type request, the cache line will be provided in the exclusive state until the RCR value is decremented to zero.

According to one embodiment of the invention, the mechanism of the current invention is used as follows. At system initialization time, the RCR values for all cache lines containing operand data are set to zero. Thereafter, whenever an operand read request is issued for a cache line having an RCR value of zero, that cache line is provided in the shared state. Any reference to the cache line will cause the RCR value to change according to the mechanism reflected by the table of FIG. 4. For example, if the cache line is returned to the MSU in a modified state, the RCR value will be set to a predetermined maximum count value. As long as the RCR value is non-zero, operand-type read requests will be fulfilled by providing the cache line in the exclusive state. If the cache line is repeatedly used for read-only purposes, the RCR value will eventually be decremented to zero. When this occurs, the associated cache line will again be provided in the shared state.

According to an alternative embodiment of the invention, RCR values may instead be set to a maximum count value, which is a positive integer. Thereafter, whenever an operand read request is issued for a cache line having a positive, non-zero RCR value, that cache line is provided in the exclusive state. If the cache line is being used repeatedly for read-only purposes, the RCR value will be decremented to zero. Thereafter, operand-type read requests for the cache line will be fulfilled by providing the cache line in the shared state. This will continue until the cache line is updated, resulting in the RCR value being set to the maximum count value once again.

The foregoing functionality can be appreciated by viewing the table of FIG. 4. An RCR value is set to the maximum count value "Maxcount" for some of the request types that explicitly requested ownership, as shown in column 404, or when the cache line was actually updated, as illustrated by several entries within columns 404, 406 and 412. In contrast, the "−1" entries that are listed in columns 406, 408, and 410 represent those situations wherein an exclusive cache line copy was used for read-only purposes. These copies were either aged from a cache in an unmodified state, or were converted to a shared copy. This activity is tracked by decrementing the RCR value so that if the read-only trend continues, the RCR value will eventually reach "zero", and the cache line will thereafter be provided in the shared state.

FIG. 5A is a diagram illustrating the format of the cache line state information within directory 101 when the cache line is not in a shared state. The information includes bits 0 through 19. Each entry includes a current owner field 500, which stores a node identifier indicating which of the nodes in the system owns the associated cache line, if applicable. The RCR field 502 contains the RCR value that is discussed above. The cache line state field 504 stores an identifier indicating a cache line state, which may be the MSU own or the exclusive state. The owner port ID field 506 maps the current owner to the MSU port that will be used to communicate with that node. The MO field 508 is an acceleration decode of the cache line state field, and is beyond the scope of the current invention. CRDC field 510 is used to detect corruption of the cache line state information.

FIG. 5B is a diagram illustrating the format of the cache line state information when the cache line is in a shared state. This format includes a shared vector field 520, which is a master-bitted field used to record which of the nodes within the system stores a shared copy of the associated cache line. When in this format, the RCR field is not tracked, as indicated by the various "not tracked" entries within the table of FIG. 4. In other words, the "not tracked" entries of FIG. 4 represent the cases wherein the cache line state is transitioning to the shared state such that the RCR field is not available for use.

When a cache line transitions from being in a shared state to a state that utilizes the format of FIG. 5A, the RCR value must be re-generated. More specifically, the RCR value is set to either zero or to the maximum count value. The RCR value is selected based on a determination as to whether the next requester is likely to modify the cache line. Returning to FIG. 4, this situation is represented by the fourth through eleventh rows of column 404. In these cases, a cache line is transitioning from the shared state to a state that tracks the RCR value. The RCR value is therefore set to either "max count" or "zero". The remaining rows of this column represent situations wherein a cache line that was in the shared state remains in the shared state such that the next RCR value is still "not tracked".

The shared format of FIG. 5B further includes a CRDC field 522 used to detect corruption of the cache line state information. Several other fields are beyond the scope of the current invention.

As can be appreciated by the foregoing description, the current invention provides a system and method that manages the state of shared data in a manner that solves the problems inherent within prior art systems. As discussed above, in some prior art systems, exclusive access is always granted for a cache line that stores operand data if that cache line has been updated any time since system initialization. This results in inefficiencies for data that is updated once during system configuration, and thereafter used solely for read-only purposes. The current invention takes any such pattern of read-only data usage into account. If this pattern continues long enough as determined by the maximum count, the cache line is thereafter provided to requesters in the shared state. This continues until the next update to the cache line occurs. If desired, the maximum count value may be modified to tailor this functionality to system conditions.

Similarly, the current invention solves the problems associated with lock cells. Recall that a lock cell is used to acquire a software lock. Lock acquisition is typically acquired by using an indivisible test-and-set operation on the lock cell. After a processor acquires the lock by setting the lock cell, one or more other processors may be testing the lock cell to determine when the lock is released. In some prior art systems, any lock cell access is granted in the exclusive state. This results in memory thrashing while multiple processors are testing the lock cell to determine whether the lock has been released.

According to the current invention, cache line usage is taken into account when granting lock cell access. The lock will initially be granted in an exclusive state following the update to the lock cell that resulted in lock acquisition. The subsequent read-only requests that are performed to determine lock availability generally occur within a software loop construct. If this read-only activity continues for a period of time after the previous modification occurs, as would likely be the case if the test operations were included within a looping construct, the MSU will begin granting the cache line in the shared state. This will allow multiple processors to test the same cell simultaneously, thus eliminating the memory thrashing that occurs within prior art systems.

It will be appreciated that many alternative embodiments of the foregoing system and method are possible within the scope of the current invention. For example, the RCR value may be used for other types of requests rather than just operand read requests. In addition, the functionality embodiment within the table of FIG. 4 may be modified within the scope of the invention. Thus, the embodiments presented herein are to be considered exemplary only, and the scope of the invention is indicated only by the claims that follow rather than by the foregoing description.

What is claimed is:

1. A system to manage memory data that is requested by one or more requesters, comprising:
 a main memory to store data signals; and
 a circuit coupled to the main memory to determine a first state in which requested ones of the data signals are provided by the main memory to a requester, the first state being based on which types of operations were performed on the requested ones of the data signals in the past, the circuit to continue to provide the requested ones of the data signals in the first state in response to at least a maximum number of sequential requests, each of which do not result in utilization of the requested ones of the data signals in a predetermined manner, the logic thereafter to provide the requested ones of the data signals in a second state.

2. The system of claim 1, wherein the circuit includes logic to determine the first state based on the manner in which the requested ones of the data signals were utilized after being provided by the main memory in response to a predetermined number of recent requests.

3. The system of claim 2, wherein the circuit includes programming logic to programmably select the predetermined number.

4. The system of claim 3, wherein the circuit includes logic to utilize the first state only when the requested ones of the data signals are a predetermined type of data signals.

5. The system of claim 4, wherein the predetermined type is operand data signals.

6. The system of claim 2, wherein the main memory includes a directory to store, for each of predetermined groups of the data signals, respectively associated state signals indicative of the manner in which an associated predetermined group of the data signals has recently been utilized.

7. The system of claim 1, wherein the logic determines that after the requested data signals are provided in the second state, the requested data signals will continue to be provided in the second state until the requested data signals are utilized in the predetermined manner.

8. The system of claim 7, wherein, following any request that results in utilization of the requested ones of the data signals in the predetermined manner, the logic provides the requested ones of the data signals in the first state in response to at least the maximum number of sequential requests.

9. The system of claim 8, wherein the first state is an exclusive state, the second state is a shared state, and wherein the predetermined manner is one that modifies the requested ones of the data signals.

10. The system of claim 9, wherein the circuit includes programming logic to allow the maximum number of sequential requests to be programmable.

11. A memory system, comprising:
 multiple requesters;
 a main memory that is divided into cache lines, each to store a predetermined number of data signals, the main memory coupled to provide any of the requesters with requested ones of the data signals;
 a directory included in the main memory to store, for each of the cache lines, respective state information that includes a Read Conditional Response (RCR) value indicative of a recent history of use of the cache line;
 a circuit coupled to the main memory to determine access rights specifying one or more types of operations a requester may perform on the requested ones of the data signals, the access rights being determined based on a RCR value for a cache line containing the requested ones of the data signals and that indicates how the requested ones of the data signals were recently used when provided in response to a predetermined number of recent requests; and
 a programming circuit to select the predetermined number.

12. The system of claim 11, wherein the state information includes a cache line state, and wherein the access rights are further determined based on the cache line state for the cache line containing the requested ones of the data signals.

13. The system of claim 12, wherein the access rights are further determined based on a request type provided with a request for the requested ones of the data signals.

14. The system of claim 13, wherein the access rights are determined only if the request type is an operand read request.

15. The system of claim 13, wherein ones of the multiple requesters may provide snoop responses to the main memory, each snoop response including a snoop response type, and wherein the access rights are further determined based on a snoop response type for the requested ones of the data signals.

16. The system of claim 11, wherein the circuit includes logic to generate a next RCR value for the cache line containing the requested ones of the data signals.

17. The system of claim 16, wherein the state information includes a cache line state, and wherein the next RCR value is determined based on the cache line state for the cache line containing the requested ones of the data signals.

18. The system of claim 17, wherein the next RCR value is further determined based on a request type provided with a request for the requested ones of the data signals.

19. The system of claim 18, wherein ones of the multiple requesters may provide snoop responses to the main memory, each snoop response including a snoop response type, and wherein the next RCR value is further determined based on the snoop response type for the cache line containing the requested ones of the data signals.

20. The system of claim 11, wherein ones of the multiple requesters are cache memories.

21. For use in a data processing system having a main memory to store data signals, and multiple requesters coupled to the main memory to request ones of the data signals, a method of managing the data signals, comprising:
 receiving a request for ones of the data signals from any of the multiple requesters;
 providing a directory in the main memory to store state information including a Read Conditional Response (RCR) value indicative of the manner in which the requested ones of the data signals have been utilized in response to a predetermined number of the most recent requests;
 determining that a latest copy of the requested ones of the data signals are not resident within the main memory, issuing a snoop request to a different one of the multiple requesters to return the requested ones of the data signals, and returning by the different one of the multiple requesters, a snoop response including a snoop response type;

determining, based on the state information, the snoop response type, and a request type, a state in which the main memory is to provide the requested ones of the data signals, the state indicating types of operations a requester may perform on the requested ones of the data signals and being based on the manner in which the requested ones of the data signals have been utilized in response to a predetermined number of most recent requests for the requested ones of the data signals; and generating a new RCR value for the requested ones of the data signals.

22. The method of claim 21, wherein the determined state is utilized only if the request is any one or more of multiple predetermined request types.

23. The method of claim 21, wherein the predetermined request type is an operand read request type.

24. The method of claim 21, wherein the state information indicates a cache line state.

25. The method of claim 21, wherein the new RCR value is determined based on the request type.

26. The method of claim 25, wherein the new RCR value is determined based on the snoop response type.

27. The method of claim 26, wherein the new RCR value is determined based on the state.

28. The method of claim 21, and further including programming the predetermined number.

* * * * *